United States Patent [19]

Duncan

[11] Patent Number: 4,659,922

[45] Date of Patent: Apr. 21, 1987

[54] OPTICAL SENSOR DEVICE FOR DETECTING THE PRESENCE OF AN OBJECT

[75] Inventor: Eugene F. Duncan, Wauwatosa, Wis.

[73] Assignee: Eaton Corporation, Cleveland, Ohio

[21] Appl. No.: 703,055

[22] Filed: Feb. 19, 1985

[51] Int. Cl.[4] .......................... G01V 9/04; G08B 13/18
[52] U.S. Cl. .................... 250/221; 250/205; 250/222.1; 340/555
[58] Field of Search .............. 250/221, 222.1, 205; 356/1, 4; 340/555, 556, 557

[56] References Cited

U.S. PATENT DOCUMENTS

| | | | |
|---|---|---|---|
| 3,443,502 | 5/1969 | Harvey | 356/1 |
| 3,624,401 | 11/1971 | Stoller | 250/222.1 |
| 4,207,466 | 6/1980 | Drage et al. | 250/221 |
| 4,479,053 | 10/1984 | Johnston | 250/221 |
| 4,582,424 | 4/1986 | Kawabata | 356/1 |

FOREIGN PATENT DOCUMENTS

| | | | |
|---|---|---|---|
| 0018710 | 2/1981 | Japan | 356/1 |
| 0034476 | 2/1982 | Japan | 250/221 |

Primary Examiner—Edward P. Westin
Assistant Examiner—Charles Wieland
Attorney, Agent, or Firm—D. A. Rowe; W. A. Autio

[57] ABSTRACT

Disclosed is an embodiment (50) of an optical sensor device adapted to detect presence of an object by reflected radiation such as visible or invisible light within viewing field (8) of an optical sensor (4) over a broader distance ("X")range without having to make physical position adjustments of a single radiation source heretofore required. Device (50) is provided with a pair of spaced-apart radiation sources (14, 16) that are positioned such that their respective radiation beams (18, 20) angularly intersect optical axis ("O") of viewing field (8) at respective angles ($\theta_1$, $\theta_2$) to provide three respective zones comprising a first zone (1), second zone (2) and an intermediate third zone (3) therebetween containing at least a portion of the first and second zones (1, 2) within viewing field (8) from any one or more of which reflected radiation from an object is able to be detected by sensor (4). Device (50) is particularly useful as a counter and has the further advantage of optimization in that the intensity of radiation beams (18, 20) is adjustably controllable.

5 Claims, 1 Drawing Figure

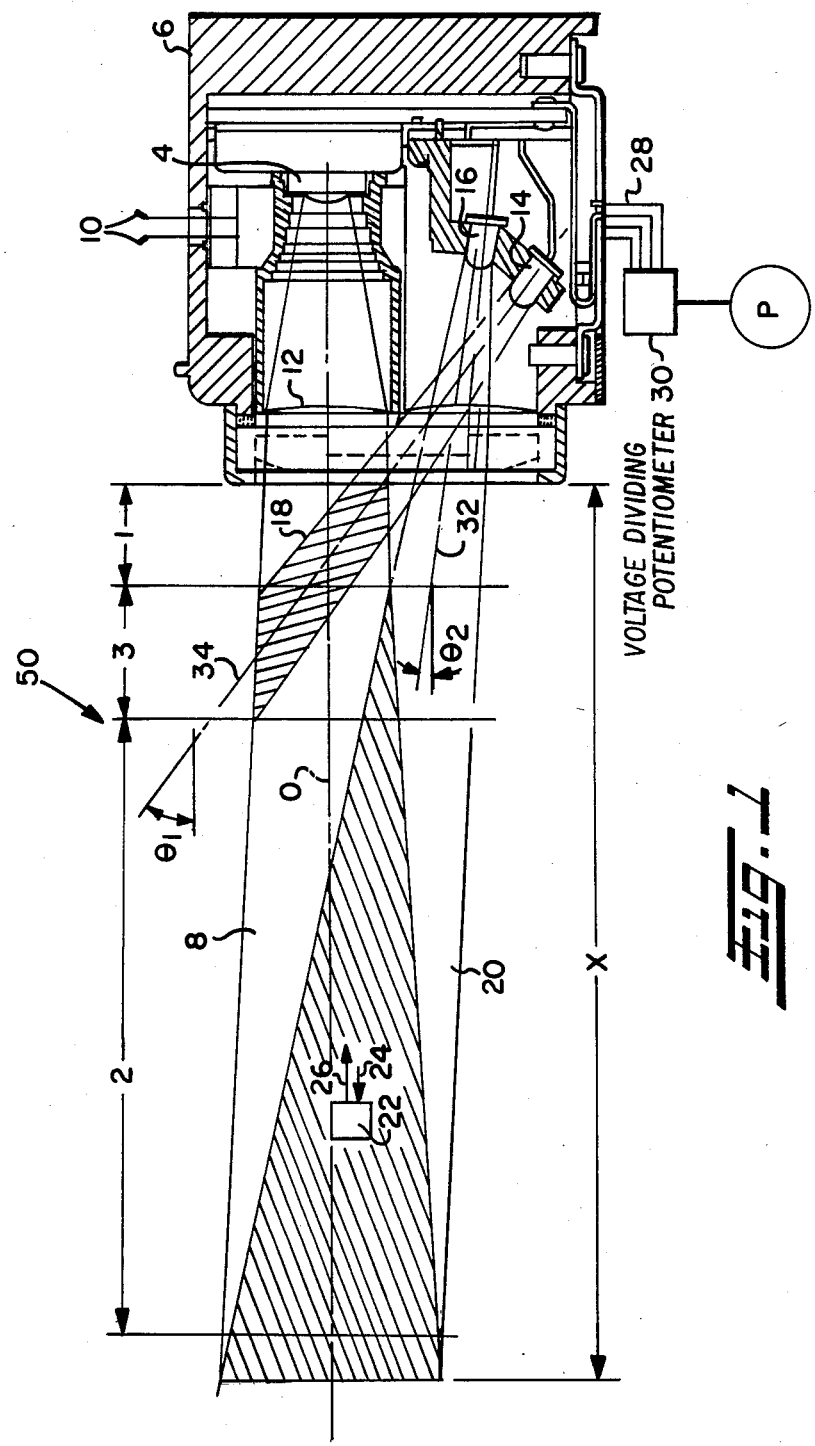

OPTICAL SENSOR DEVICE FOR DETECTING THE PRESENCE OF AN OBJECT

INTRODUCTION

This invention relates generally to an optical sensor device adapted to detect the presence of an object by use of reflected radiation therefrom commonly in the form of light (visible or invisible radiation) and more particularly to such device that utilizes two radiation beams that intersect the viewing (sensing) field of an optical detector to provide three zones therewithin from which the object may be optimally detected according to the relative intensity of the respective radiation beams.

BACKGROUND OF THE INVENTION

Optical sensors for sensing the presence of an object within the viewing (sensing) field of an optical detector by monitoring reflected radiation, commonly light, from either a target behind the object or from the object itself have been known for many years. Such sensors are particularly commonly used as counters in applications where the object passes across the detector's viewing field and either reflects light incident thereupon towards the detector or interrupts a light beam incident upon a reflector. The source of the radiation is generally adapted by prisms and the like to provide a beam of radiation that enters the detector's viewing field at an angle that enables the radiation to be reflected from the object or the reflector, as the case may be, towards the detector. Conversely, the radiation source may be positioned opposite the detector to direct a beam of radiation directly at the detector rather than by reflection which if intersected by an object passing therebetween is able to act as a counter or perform some other function.

An example of photoelectric sensor heads used for such purpose is disclosed in pages 1–3 of Eaton Corporation's Publication No. 17203 which is incorporated herein by reference. Generally such sensors are particularly adapted to provide counting information by detecting the absence of light (intersection by an object in the sensor's viewing field) or the presence of light (reflection by an object in the sensor's viewing field).

Of interest to the present invention is the reflective type of sensor system in which the photoelectric sensor or optical detector receives radiation, commonly light, reflected from the object within the viewing field of the detector. The terms such as light, optical, photoelectric, viewing field, and the like as used herein are intended to encompass both visible and invisible radiant energy or radiation such as luminous and ultraviolet or infrared and other radiation as is apparent from the above Publication No. 17203.

Heretofore, it has been common practice to use a single beam of radiation for intersecting the detector's viewing field at an angle enabling it to be reflected towards and be received by the detector from an object present in a single zone defined within the boundaries of intersection between the detector's viewing field and the radiation beam. Generally, the effectiveness of the detector is influenced by the distance of the zone from the detector and the intensity of the radiation beam. However, the distance of the object from the detector may vary for particular applications. In order to change the location of the zone with respect to the detector to accommodate for particular distances of the object from the detector, it has heretofore been required to physically change the position of the radiation source so as to change the angle at which the radiation beam intersects the detector's viewing field and accordingly change the location of the zone within the detector's viewing field. Such practice is inconvenient and may often be difficult to accomplish resulting in a need to provide a more convenient and accurate means of enabling effective receipt by an optical detector of reflected radiation from an object over a broader distance range within the viewing field of the detector.

SUMMARY OF THE INVENTION

Accordingly, it is an object of this invention to provide an improved sensor device for detecting the presence of an object within the viewing field of an optical detector upon receipt of reflected radiation therefrom.

It is another object of this invention to provide a sensor device for detecting the presence of an object within the viewing field of an optical detector upon receipt of reflected radiation therefrom that is effective over a broad distance range between the object and the detector.

It is yet another object of this invention to provide a sensor device for detecting the presence of an object within the viewing field of an optical detector that is effective over a broad distance between the detector and the object without having to physically change the angularity at which a radiation beam incident upon the object intersects the detector's viewing field.

BRIEF DESCRIPTION OF THE DRAWINGS

FIG. 1 shows a plan elevation view of an embodiment of the sensor device of the invention.

DESCRIPTION OF A PREFERRED EMBODIMENT

An embodiment of the sensor device of the invention in the form of device 50 is shown in FIG. 1. Device 50 includes an optical detector or photoelectric sensor 4 preferably mounted in a housing 6. Detector 4 is adapted to provide an electrical output function such as through output leads 10 in response to variations in radiation, commonly light, that it receives. One of the more common applications as previously described is where detector 4 is adapted to provide a counting function.

Detector 4 has a viewing field 8 which has an optical axis "O" and which commonly has a generally cone shaped configuration as shown in FIG. 1 but which may be varied by prisms such as prism 12 and blocking screens and the like as is well known to those skilled in optical art.

Field 8 extends for a distance "X" away from its exit point from housing 6. The length of distance "X" generally varies according to the optical characteristics of detector 4 and its associated lenses or prisms as well as with the intensity of radiation reflected theretowards from an object in the viewing field. Generally, distance "X" increases with increases in the radiation intensity since the optical detector is then able to see or otherwise view reflected radiation from the object which it might not have viewed effectively enough to provide some desired function had the intensity been lower.

A first radiation source means preferably in the form of a light emitting diode 14 is positioned to provide a radiation beam 18 therefrom that angularly intersects viewing field 8 to provide a first zone 1 within field 8 as shown by the vertical lines. Diode 14 is preferably secured to housing 6 in the manner shown in FIG. 1.

Second radiation source means preferably in the form of light emitting diode 16 is positioned to provide a radiation beam 20 therefrom that angularly intersects viewing field 8 to provide a second zone 2 therewithin. Diode 16 is preferably secured to housing 6 in the manner shown in FIG. 1. For illustrative purposes, the respective central optical axes 34 and 32 of beams 18 and 20 intersect optical axis "O" of field 8 at respective angles $\theta_1$ and $\theta_2$, respectively which are necesarily different from each other. A third zone 3 having respective portions of zones 1 and 2 that overlap within viewing field 8 is also provided intermediate zones 1 and 2 as shown in FIG. 1. Understandably, the relative angularity between beams 18 and 20 may be varied such that respective variable portions thereof overlap in zone 3 within field 8.

The three zones described above are generally three dimensional having a configuration that varies with the shape of field 8 and beams 18 and 20 as well as with respective angularity at which these beams intersect field 8.

Prior art devices, as previously described, utilize only one beam which would result in only one zone which would necessarily be of shorter length than distance "X". In order to shorten or lengthen the distance "X", one heretofore would have to physically rotate or reposition the radiation source so as to alter the angularity of the intersection of its beam with the optical detector viewing field.

Diodes 14 and 16 are positioned with respect to detector 4 so that radiation therefrom incident upon an object in any one of the three zones is able to be reflected towards and be received by detector 4 so that detector 4 is able to perform the functions desired which may be a counting function on objects passing through the zones in a direction generally trasverse to optical axis "0" of field 8. An example of an object 22 present in zone 2 that receives radiation 24 from source 16 and has a surface that reflects it in the form of reflected radiation 26 towards detector 4 is shown for illustrative purposes in FIG. 1.

Diodes 14 and 16 are adapted to provide respective radiation beams 18 and 20 of variable or controllable intensity by adjustment or variation in electrical power delivered respectively thereto.

Understandably, detection of the presence of an object in zone 1 may be optimized for many applications when the intensity of beam 18 is increased to a maximum. Likewise, detection of the presence of an object in zone 2 may be optimized for many applications when the intensity of beam 20 is increased to a maximum. Detection of the presence of an object in intermediate zone 3 may be optimized for many applications when the intensities of beams 18 and 20 are substantially equal with both at their respective maximum intensities.

The ability to vary or control the respective intensities of beams 18 and 20 from a minimum of zero to a maximum provides for numerous intensity combination possibilities that may be used to advantage for particular applications. Beam 18 may be turned off, for example, and the intensity of beam 20 increased to a maximum for a particular application or vice versa for another application or both beams 18 and 20 may be at some equal to unequal level of intensity less than a maximum capable by either. Additionally, the object may be such that it provides a reflective surface only in zone 1 or it may provide reflective surfaces in any combination of the three zones which may be of value for particular applications.

Electrical power source "P" provides a source of electrical power to diodes 14 and 16. Power source P is normally an alternating voltage source but may be a direct voltage source where such is suitable for the particular radiation source means being employed. Although each of diodes 14 and 16 may have its own source of power, it is preferable to use one source for both.

Power variation or adjustment means preferably in the form of a voltage dividing potentiometer 30 having electrical leads generally referenced as 28 provides a means of varying the power respectively delivered to diodes 14 and 16 and thereby correspondingly varies their respective radiation beam intensities. The use of a single or dual source of electrical power in conjunction with a single potentiometer for each radiation source enables one to increase the intensity of radiation beam 18 while reducing the intensity of radiation beam 20 or vice versa to provide a multitude of intensity combinations between the two that may be used to advantage. Conversely, separate potentiometers powered by a single or separate source of power may be used to adjust the intensity of beam 18 and 20 independently from each other where such is desired.

Although detector means 4 and diodes 14 and 16 are preferably secured to single housing such as housing 6, they can of course be positionally secured in a variety of other ways where such may be of advantage in a particular application.

What is claimed is:

1. A sensor device for detecting the presence of an object located within at least one of three zones within a sensing field of a radiation detector, said device comprising:

radiation detector means having a sensing field of predetermined length and operative to detect the presence of an object within said field upon receipt of radiation reflected from said object towards said detector means and to provide an output signal;

first radiation source means positioned to provide a first radiation beam of controllable intensity that angularly intersects said sensing field to provide a first zone in said sensing field from which said reflected first radiation is able to be received by said detector means;

second radiation source means positioned to provide a second radiation beam of controllable intensity that angularly intersects said sensing field to provide a second zone in said sensing field from which said second reflected radiation is able to be received by said detector means, and said first and second radiation beams overlapping a common portion of said sensing field to provide an intermediate third zone between said first and second zones within said sensing field from which said object will reflect said radiation and said reflected radiation is able to be received by said detector means;

means for supplying power from a power source to said first and second radiation source means;

and control means comprising means for selectively adjusting said power supplied to said first and second radiation source means to correspondingly change the relative intensities of the respective first and second radiation beams thereby to cause said detector to receive sufficient reflected radiation from an object in any of said zones at correspondingly different distances from said detector means within said sensing field to provide said output signal.

2. The sensor device as claimed in claim 1 and further including a housing to which said radiation detector means and said first and second radiation source means are secured.

3. The sensor device as claimed in claim 1 wherein each said radiation source means is a light emitting diode.

4. The sensor device as claimed in claim 1 wherein said object passes through at least said first, second or third zone and said detector means provides a counting function.

5. The sensor device as claimed in claim 1, wherein said control means comprises means for adjusting said power supplied to said first and second radiation source means to correspondingly change the relative intensities of the respective first and second radiation beams such as to cause said detector to receive sufficient reflected radiation from an object in any parts of said zones at correspondingly different distances from said detector throughout the entire length of said sensing field to provide said output signal.

* * * * *